United States Patent
Campbell et al.

(10) Patent No.: US 6,791,225 B2
(45) Date of Patent: Sep. 14, 2004

(54) FLYWHEEL MAGNETO GENERATOR

(75) Inventors: Peter Campbell, Raleigh, NC (US); David Johnston Miller, Apex, NC (US)

(73) Assignee: Magnequench, Inc., Anderson, IN (US)

( * ) Notice: Subject to any disclaimer, the term of this patent is extended or adjusted under 35 U.S.C. 154(b) by 0 days.

(21) Appl. No.: 10/370,559

(22) Filed: Feb. 20, 2003

(65) Prior Publication Data

US 2003/0127922 A1 Jul. 10, 2003

Related U.S. Application Data

(63) Continuation of application No. 09/735,468, filed on Dec. 14, 2000, now abandoned.

(51) Int. Cl.[7] .............................. H02K 3/02; H02K 1/08; H02K 1/24
(52) U.S. Cl. ........................ 310/181; 310/216; 310/268; 310/74
(58) Field of Search ................................ 310/261, 216, 310/254, 43, 74, 181, 152, 153, 113, 268; 123/149 D, 149 C, 599

(56) References Cited

U.S. PATENT DOCUMENTS

| | | | |
|---|---|---|---|
| 3,832,581 A | * | 8/1974 | Hoffmann et al. ............ 310/46 |
| 3,932,069 A | * | 1/1976 | Giardini et al. ............. 417/420 |
| 3,947,710 A | | 3/1976 | Miyamoto .................. 310/153 |
| 3,955,550 A | | 5/1976 | Carlsson ..................... 123/149 |
| 4,059,812 A | | 11/1977 | Procter ........................ 331/1 A |
| 4,146,806 A | | 3/1979 | Katsumata .................. 310/153 |
| 4,281,265 A | * | 7/1981 | Eastham et al. ............ 310/254 |
| 4,295,070 A | | 10/1981 | Johansson ................... 310/153 |
| 4,390,804 A | * | 6/1983 | Orova et al. .............. 310/70 R |
| 4,625,135 A | | 11/1986 | Kasabian .................... 310/156 |
| 4,674,178 A | | 6/1987 | Patel ........................... 29/598 |
| 5,214,333 A | | 5/1993 | Kawamura .................. 310/153 |
| 5,265,573 A | | 11/1993 | Imoli ......................... 123/418 |
| 5,341,060 A | | 8/1994 | Kawamura .................. 310/153 |
| 5,477,841 A | | 12/1995 | Trost et al. ................. 123/599 |
| 5,514,923 A | | 5/1996 | Gossler et al. ................ 310/74 |
| 5,704,338 A | | 1/1998 | Andersson et al. ......... 123/599 |
| 5,905,321 A | * | 5/1999 | Clifton et al. .............. 310/178 |
| 6,040,634 A | | 3/2000 | Larguier ...................... 290/45 |
| 6,097,118 A | | 8/2000 | Hull ............................ 310/74 |
| 6,323,576 B1 | | 11/2001 | Applegate ................... 310/268 |

* cited by examiner

Primary Examiner—Tran Nguyen
(74) Attorney, Agent, or Firm—Jones Day

(57) ABSTRACT

The invention relates to a flywheel magneto generator having a rotor assembly and a stator assembly. The rotor assembly includes a non-ferromagnetic flywheel and a plurality of magnetic poles that are positioned in spaced relationship around the circumference of the flywheel. The stator assembly includes an E-shaped core with a single magnet mounted on the center leg and coils associated with at least the outer legs. The poles and core may be formed of a bonded iron material. The poles may be joined to the flywheel by press fitting or integral molding, among other methods.

28 Claims, 4 Drawing Sheets

FLYWHEEL MAGNETO GENERATOR

This is a continuation of application Ser. No. 09/735,468, filed Dec. 14, 2000 now abandoned.

FIELD OF THE INVENTION

The present invention relates to a flywheel-type magneto generator. More particularly, the invention relates to a flywheel magneto generator for a rotary engine that includes a single construction, multi-pole rotor and a three-legged stator, with a magnet provided in the center leg of the stator and coils provided on the outer legs of the stator.

BACKGROUND OF THE INVENTION

Flywheels and magneto ignitions are typically installed in smaller, two-stroke engines, such as lawn mower and weed eater engines. A magneto is a device that produces alternating current for distribution to the spark plugs of an engine. A conventional flywheel magneto generator includes a rotor assembly and a stator assembly. The rotor assembly has a flywheel and a plurality of poles disposed around the peripheral wall of the flywheel. Permanent magnets are secured by bolts to the poles. A stator assembly confronts the permanent magnets on the rotor to generate electrical energy. These systems have been known to result in large eddy current losses with resultant heat generation in the poles. U.S. Pat. No. 5,214,333 depicts such a flywheel generator. U.S. Pat. No. 4,146,806 discloses a magnet that is secured to the rotor by a screw.

In other flywheel magneto generators, a single magnet is mounted on the flywheel and the flux of the magnet is brought out to the working radius of the flywheel by pole shoes that are made of a magnetically conductive material. The stator assembly is typically a U-shaped core that is made of a magnetically conductive material. The ends of the core are positioned close to the path of the poles' shoes on the flywheel. The magnet on the rotating flywheel produces a magnetic field through a permeability path provided by the stator assembly. One or more coils are wrapped around the core. When the flux passes through the core, a voltage is generated in the coils. This voltage may be stored or used to start an engine. This prior art system was not optimized since flux was generated in the stator assembly only once for each revolution of the flywheel.

Also, prior art systems that utilized magnets on the flywheel also were required to find ways to attach the magnet to the flywheel, keeping in mind that the flywheel had to be balanced in order to operate smoothly. Magnets have been attached by screws, for instance. Proper balancing of the flywheel rotor is difficult and adds complexity to the system. For instance, U.S. Pat. No. 3,947,710 discloses a flywheel magneto generator that has a flywheel with a balance weight, which is used to balance the output shaft to the rotary engine.

In order to overcome some of the problems that existed with mounting magnets on flywheels, the magnet has been mounted on the stator assembly in a fixed position. For instance, U.S. Pat. No. 5,704,338, the disclosure of which is incorporated herein by reference, discloses a flywheel magneto generator that has a U-shaped stator core with a magnet disposed at one end of the U. The rotor assembly includes a reluctor wheel 47 that is formed from a laminated stack of discs that are made of a highly magnetically permeable material. A circular plate of steel is secured to the top surface of the wheel and includes vanes that are bent to produce a flow of cooling air to the engine when the rotor rotates. Other prior art devices are also known.

The prior art did not provide a magneto generator that could provide an output that increased proportionally to increased rotary speed. For instance, it is desirable to obtain an output voltage that linearly increases as the rotary speed of the generator increases. Prior magnetos provided voltage levels that fell off at rotor speeds of over about 1500 rpms. Such devices also did not meet voltage output requirements at all rotational velocities. Output was found to decrease as flywheel velocities increased. This was caused by eddy current losses. Also, the flux signal of these devices was not sinusoidal. Instead, there were null zones during which the flux changed very little with time. This was undesirable.

SUMMARY OF THE INVENTIONS

The present invention provides a flywheel magneto generator, a rotor for a flywheel magneto generator, and a method of generating electrical energy in an engine. In one embodiment, the flywheel magneto generator for an engine includes a rotor, a stator core, a magnet, and at least one coil. The rotor is mounted for axial rotation to an engine output shaft and has a non-ferromagnetic inner portion and at least one magnetically conductive outer portion. The rotor has a periphery defined by a path of rotation of the outer portion. The stator core is disposed adjacent the periphery of the rotor and is operatively associated therewith. The magnet is operatively coupled to the stator core and the coil is associated with the stator core.

The stator core may have at least two legs and two coils. Each of the coils is associated with one of the legs of the stator core.

The stator core may be E-shaped, having a center leg and two outer legs. The magnet may be connected to the center leg of the core and the coil may be associated with an outer leg of the core. The at least one outer portion may be a pole, with a plurality of poles provided around the circumference of the inner portion. Each of the poles is magnetically isolated from the other poles.

The stator core has a width that extends between three of the poles. In addition, the plurality of poles may be spaced relative to one another to define a gap between each pole. In one embodiment, these gaps are substantially equal in size. The magnet has a width that may be substantially equivalent to the width of the gap between the poles.

In one embodiment, the rotor rotates at a selected speed and an output from the stator core is voltage. The relationship between output voltage and the selected speed is linear so that voltage increases at a substantially constant rate as the selected speed increases. In another embodiment or the same embodiment, voltage, which is generated over a given time period at a constant selected speed, increases and decreases in a substantially sinusoidal manner.

The rotor may include a connection point for attachment to an engine output shaft. In addition, the at least one outer portion of the rotor and the stator core may be formed of bonded iron.

In another embodiment of the invention, the flywheel magneto generator includes a rotor and a stator operatively coupled to the rotor. The rotor includes a flywheel center portion having a circumference and a plurality of poles positioned around the circumference of the flywheel center portion, with each pole having a width. A gap is provided between each of the plurality of poles. The stator includes an E-shaped core having two outer legs and a center leg, with a distance provided between the two outer legs. The gap between the poles is substantially equivalent to the width of the magnet, and the width of each pole is substantially equivalent to the distance between the two outer legs of the core.

The rotor is preferably rotatable and the stator is substantially fixed in position relative to a rotational path of the rotor. The ends of the outer legs of the E-shaped core and the magnet are in close proximity to the rotational path of the rotor. The ends of the legs of the E-shaped core may be configured and dimensioned to substantially align with the rotational path of the rotor. The ends of the legs and the magnet may be spaced about one millimeter from the rotational path of the rotor.

At least one coil may be associated with the E-shaped core. Two coils may be provided. One of the two coils may be operatively coupled to one of the outer legs of the E-shaped core and the other coil may be operatively coupled to the other outer leg of the E-shaped core.

In another embodiment, a rotor for a flywheel magneto generator is provided. The rotor includes a substantially disc-shaped, non-ferromagnetic flywheel having an outer circumference. A plurality of poles are positioned around the outer circumference of the flywheel and extend from the flywheel. The poles are spaced relative to one another. The flywheel and poles together form a single substantial disc-shape.

The poles are magnetically conductive and may be evenly spaced around the circumference of the flywheel. A gap may be provided between each pole of the plurality of poles. Eight poles may be provided and the poles are made of bonded iron. The poles are magnetically isolated relative to one another.

The poles may be joined to the flywheel by a number of methods. For instance, the flywheel and poles may be press-fit together. They may be glued together, or they may be integrally molded together.

The invention also relates to a method for generating electrical energy in an engine having an output shaft with a flywheel magneto generator associated with the output shaft. The method includes providing a non-ferromagnetic flywheel having a circumference with a plurality of magnetically conductive poles. The poles are spaced at equal intervals around the circumference of the flywheel. The method also includes providing a stator assembly with one magnet and at least one coil operatively coupled to the assembly. The stator assembly is in close association with the flywheel. The method further includes rotating the flywheel to generate energy through the at least one coil. The method may also include controlling the flow of generated energy to supply power to charge a battery when the engine is operated above a preselected speed.

In one embodiment of the method, the stator assembly is E-shaped and has two outer legs and a center leg. One coil may be wrapped around one of the outer legs and another coil may be wrapped around the other outer leg. A magnet is positioned at the end of the center leg.

BRIEF DESCRIPTION OF THE DRAWINGS

Preferred features of the present invention are disclosed in the accompanying drawings, wherein identical reference characters denote like elements throughout the several views, and wherein.

DETAILED DESCRIPTION OF THE INVENTION

Figure 1:
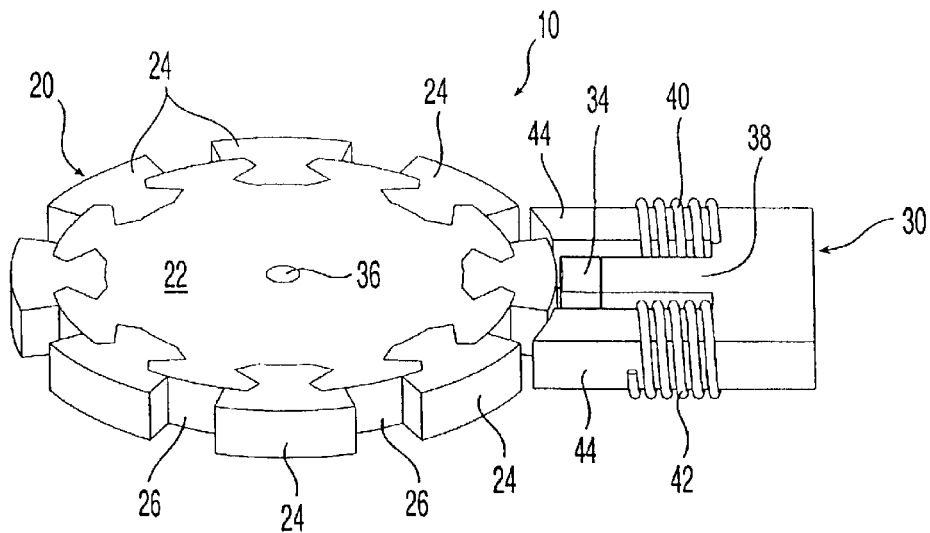
FIG. 1 is a schematic perspective view of a flywheel rotor and stator according to the invention.
Figure 2:
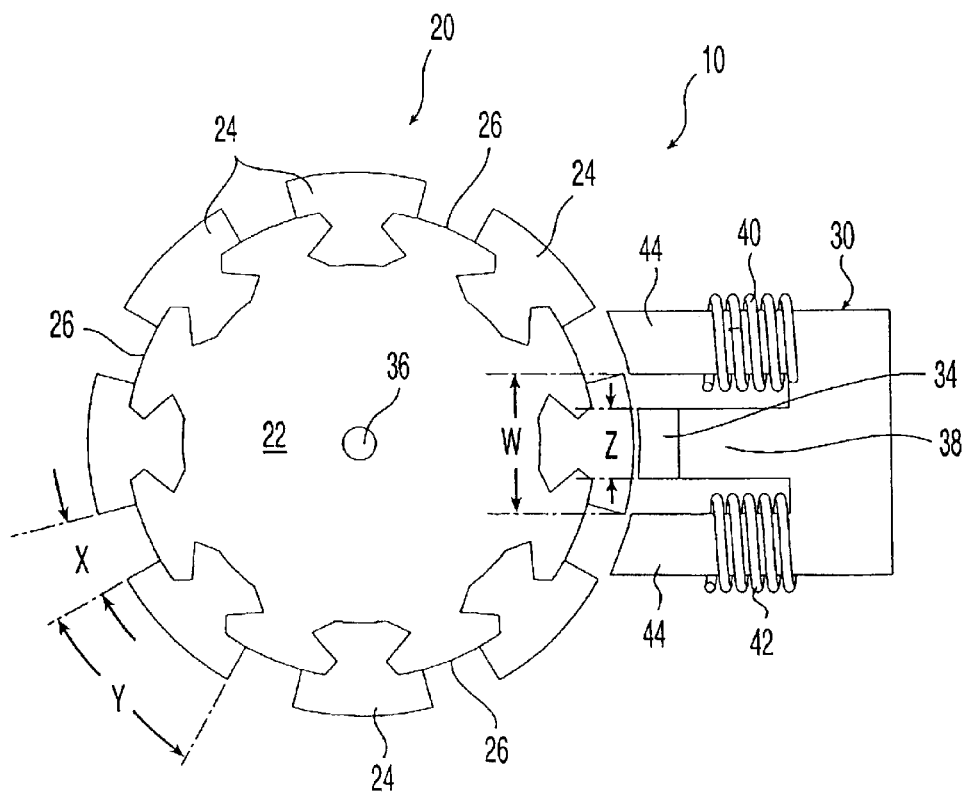
FIG. 2 is a top view of the flywheel rotor and stator, similar to FIG. 1.

The present invention relates to a flywheel magneto generator that offers simple construction and improved performance characteristics. Referring to FIGS. 1 and 2, the flywheel magneto generator 10 according to the invention includes a rotor assembly 20 and a stator assembly 30. The rotor assembly 20 includes the flywheel 22, which is the central portion of the rotor, and a plurality of poles 24, positioned around the outer circumference 26 of the flywheel 22. The stator assembly 30 includes a core 32, with a single magnet 34 mounted on the core 32. As will become evident from the description below, the flywheel 22 may be produced without the expenses previously known in the art to be associated with securing and balancing magnets and poles on the rotor assembly 20, as was typically required for rotors that operate at high rotational velocities.

Figure 3:
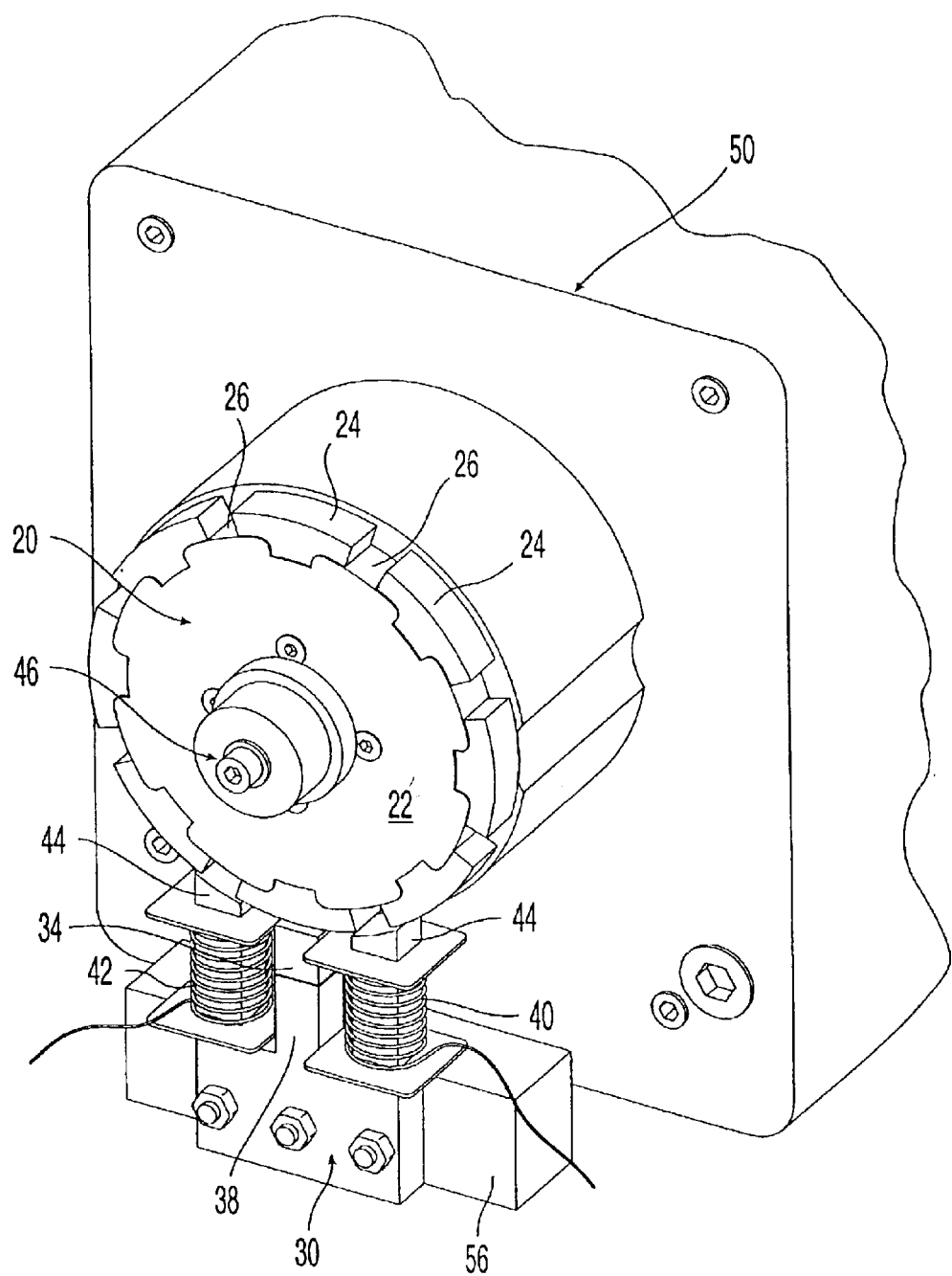
FIG. 3 is a perspective view of a flywheel magneto generator showing the flywheel and stator similar to that of FIG. 1 installed on an engine.

The rotor assembly and stator assembly of the invention are shown installed on an engine 50 in FIG. 3. The flywheel rotor 20 includes a connection point 36, which is preferably provided in the center of the flywheel 22 for association with an engine shaft 46. The shaft and rotor rotate in concert when the shaft is associated with the rotor assembly. The rotor is configured and dimensioned such that it has an inertia sufficient to allow a steady operation of an engine 50. The stator assembly 30 is preferably fixed in location by a stand 56, or other mechanism, in close proximity to the rotor assembly 10.

As shown in FIG. 2, the flywheel 22 includes a circumference 26. A plurality of individual poles 24 are positioned around the circumference 26 of the flywheel 22. It should be understood that even though the word "circumference" is used herein to describe the outer periphery of the flywheel 22, the circumference 26 of the flywheel 22 is not required to have a perfectly circular exterior, although it is generally rounded. The circumference 26 of the flywheel 22 may be irregular, as shown in FIGS. 1–3. In addition, a periphery of the rotor assembly 20 is also described herein and shown in the drawings. The periphery of the rotor assembly 20 is defined by the outer path of rotation of the rotor. Therefore, the periphery of the rotor assembly is distinguished from the circumference 26 of the flywheel 22. The circumference 26 of the flywheel 22 will generally be positioned inside the periphery of the rotor assembly 20.

Figure 4:
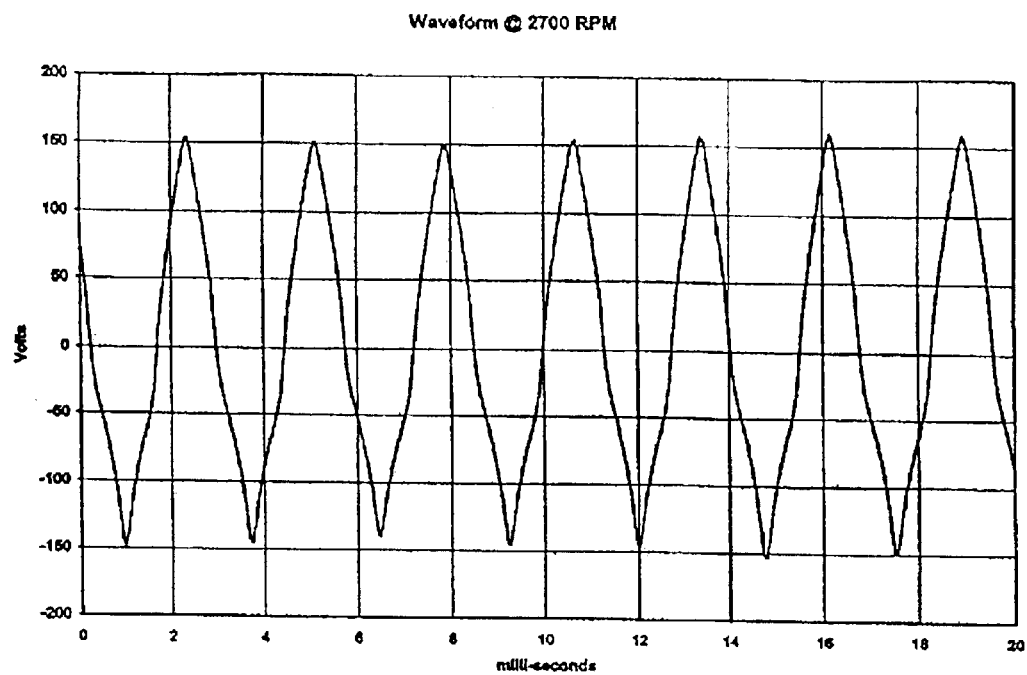
FIG. 4 is a graph showing the output voltage of a flywheel magneto generator according to the invention.

The poles 24 on the flywheel 22 are magnetically conductive, while the flywheel 22 is non-ferromagnetic. The provision of individual poles 24 on flywheel 22 assists in generating output in the configuration of a uniform waveform, as shown in FIG. 4. The provision of individual poles also allows for variation in the configuration of the flywheel rotor 20. For instance, with individual poles, it is possible to provide optimized gaps and widths of poles that are desired for the particular application.

As shown in FIGS. 1 and 2, the poles 24 are not connected to one another. The poles 24 are spaced from one another by portions of the flywheel 22 which form the circumference 26 of the flywheel 22. The provision of individual poles 24 that are separated by portions of the flywheel 22 allows the poles to be magnetically isolated, which is desirable because it avoids undesirable secondary flux coupling. Secondary flux coupling occurs when magnetic flux travels through unintended paths, and is, thus, wasted. The spacing between the poles is prescribed based upon the performance level required. In a preferred embodiment of the invention, the spacing X between the poles 24 is preferably no greater than the width Z of the magnet 34.

The use of individual flywheel poles 24 assists in generating a substantially uniform waveform output, as shown in FIG. 4. The use of individual poles also allows for a variety of configurations of the flywheel rotor 20 and stator 30. With individual poles, it is possible to provide optimized gaps X and widths Y of poles that are desired for a particular application, or for a particular stator configuration. In addition, the number of poles 24 on the flywheel 22 can vary. The output frequency of the magneto 10 is proportional to the number of flywheel poles 24 selected.

Referring again to FIGS. 1 and 2, in a preferred embodiment, the stator 32 is E-shaped. A magnet 34 is located in the center leg 38 of the E-shaped core 32, and wire wound coils 40, 42 are located on the outer legs 44 of the core 32. Two coils are shown and discussed herein, but more than two coils may be utilized. For instance, U.S. Pat. No. 3,955,550, the disclosure of which is incorporated herein by reference, includes more than two coils for a variety of purposes.

The stator legs 44 and magnet 34 are preferably closely positioned next to the rotor 20. In a preferred embodiment, a clearance of about 0.7 millimeters is provided between the ends of the magnet 34 and outer legs 44 and the ends of the poles 24. A preferred clearance ranges from about 0.5 millimeters to about 1 millimeter, although this may vary based upon the application.

The magneto 10 assists in generating a spark in a spark plug for an engine 50 to get the engine started. The two coils 40, 42 of the stator are positioned around the outer limbs 44 of the core 32. The coils 40, 42 act together, with the magnet 34 positioned at the end of the center limb 38. Voltage is induced in the outer limbs 44 of the E-shaped core 32 and this voltage is used to create the spark in the spark plug.

Figure 6:
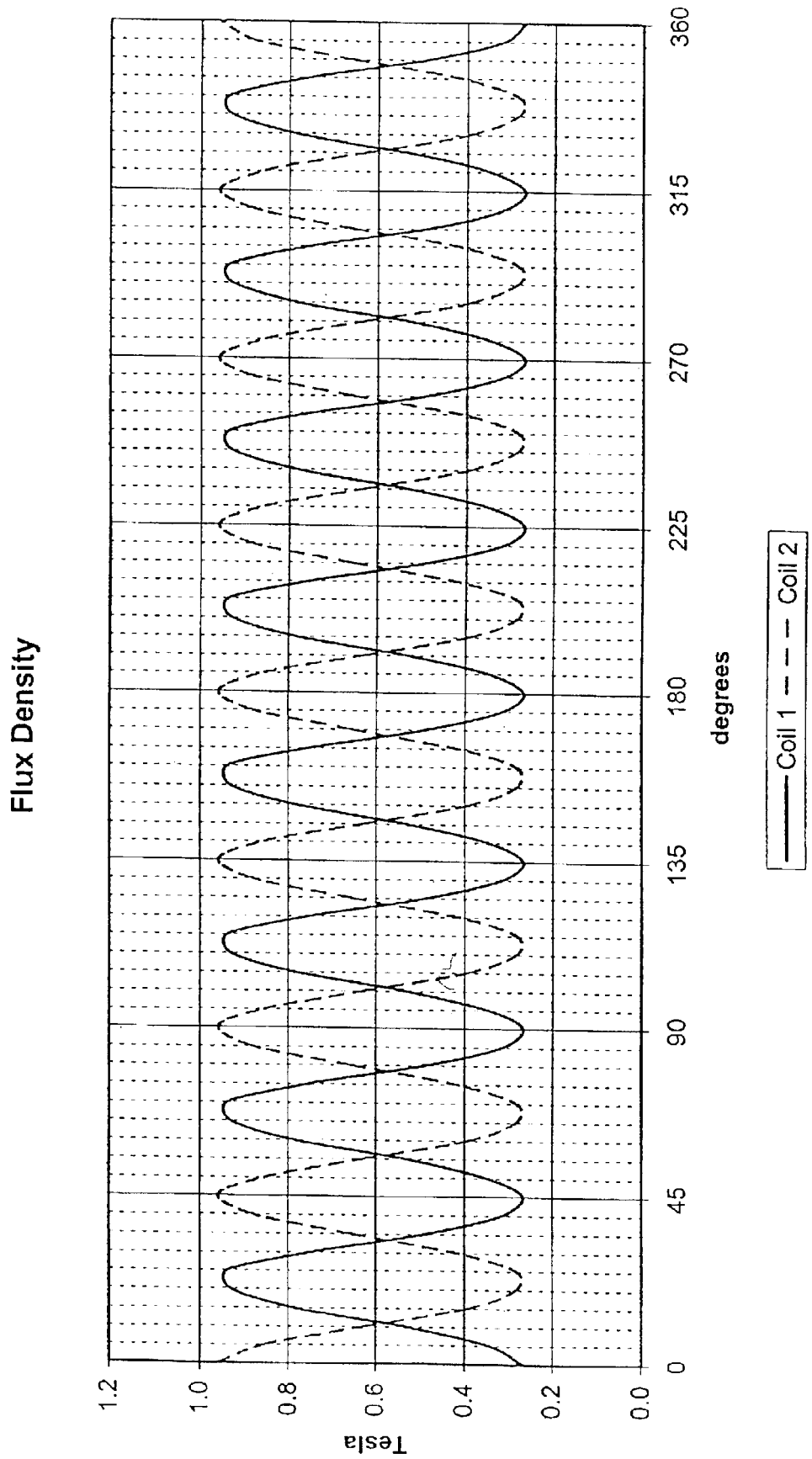
FIG. 6 is a graph showing the flux density from a stator assembly of a flywheel magneto generator according to the invention where at least two coils are positioned around the stator assembly.

In operation, the flywheel poles 24 complete a magnetic circuit from the magnet 34 to the wire coils 40, 42 as the poles 24 of the flywheel 22 rotate past the stator assembly 30. A circuit is completed when the magnet and each outer leg 44 aligns with a pole 24 on the flywheel 22. As the poles 24 rotate toward completing the circuit, flux in the circuit rises to a peak. As the poles 24 rotate away from completing a circuit, flux in the circuit falls to a minimum. This rising and falling flux pattern induces voltage in the wire coils 40, 42. The E-shape of the core 36 allows a flywheel pole 24 to rotate into one magnetic circuit and out of another magnetic circuit simultaneously. This provides two induced voltage signals that are opposite in phase, as depicted in FIG. 6. These two signals can be added together or utilized separately. Advantageously, with a single magnet 34 positioned on the stator 30, the magneto 10 can provide a continuous substantially sinusoidal voltage signal through 360° of rotation of the flywheel 22.

A sinusoidal flux signal, as shown in FIG. 6, is achieved by utilizing an angular span X between the poles 24 that is no greater than the width Z of the magnet 34. This pole spacing fills voids in the flywheel rotor 20 so that at least one outer leg 44 of the core 32 (and thus one coil 40, 42) is coupled to the magnet 34 at all times. It is preferred that both outer legs 44 of the E-shaped core 32 (and thus both coils 40, 42) be coupled to the magnet 34 during operation. Continuous coupling of the coils 40, 42 to the magnet 34 of the core 32 removes null zones in the output signal, as were known in the prior art.

In order to provide a substantially sinusoidal output signal, as shown in FIGS. 4 and 6, for a flywheel having a plurality of individual magnetic poles, two criteria should be met. First, the gaps X between the flywheel poles 24 should be substantially equivalent to the width Z of the magnet disposed on the core 32. Second, the widths Y of the poles 24 on the flywheel 22 should be substantially equivalent to the gap W between the outer legs 44 of the core 32. These two requirements dictate the pole configuration of the flywheel rotor 20. The flywheel rotor 20 can consist of a different number of poles than is shown in the figures, provided the width of the poles and their spacing meet the requirements of spacing and size, described above. For the same stator spacing, fewer poles will result in a smaller diameter flywheel while a greater number of poles will result in a larger diameter flywheel.

It is often desirable to adjust the number of flywheel poles 24 in order to adjust the magneto's frequency. In this way, if a particular waveform frequency is desired, the user may select that frequency without changing the amplitude of the voltage output. While an optimized generator is preferred, there are instances where optimization is not critical. Therefore, while these criteria may result in an optimized system, they are not considered to be critical to the invention since other aspects of the invention may be utilized without meeting the spacing criteria identified above.

The angular spans X for the poles 24 and their spacing are preferably optimized using the above described criteria to achieve a rapid transition rate from one coil coupling to the next coil coupling. When this transition rate is maximized to avoid null spots, the flux change rate and the induced voltage are optimized for each coil. As shown in FIG. 1, a preferred number of poles is eight. Compared to a prior five pole design which featured wider gaps between the poles (such that the gaps did not meet the criteria identified above), the eight-pole design features an approximately 40% shorter cycle. This shorter cycle increases the induced voltage in the coils by making the peak to peak flux change occur in a shorter time.

Figure 5:
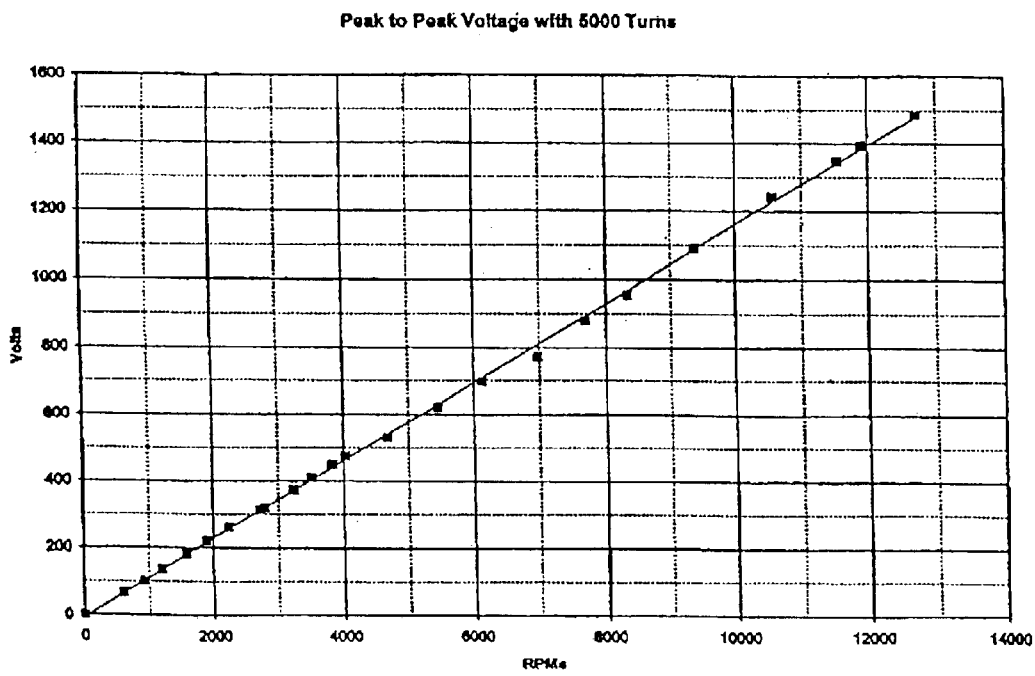
FIG. 5 is a graph showing the output voltage versus operating speed of a flywheel magneto generator according to the invention.

As shown in FIG. 5, the invention provides higher output at greater speeds. The invention provides a signal amplitude gain that remains linear up to flywheel velocities of at least about 13,000 rpms, as confirmed by test data shown in FIG. 5. It is believed that the invention is operable above speeds of 13,000 rpms as well, although test facilities limited the speed of testing to 13,000 rpm. The invention provides increases in output for corresponding increases in speed such that the relationship between the increase in voltage versus increase in speed is substantially linear.

In a preferred embodiment, the flywheel 22 is a non-ferromagnetic material in the shape of a hub. The flywheel may be made of aluminum, plastic, brass, or other materials. The poles are preferably formed of bonded-iron and are joined to the hub by conventional means. The stator is also preferably manufactured of bonded iron to minimize current losses at high flywheel velocities. Bonded iron is a compacted, insulated, soft iron powder. An iron powder is insulated with a liquid epoxy, compacted, and cured. The use of bonded iron for the poles 24 offers at least several advantages. First, it allows for an inexpensive, single operation manufacturing process. Second, the low conductivity of the bonded iron helps to avoid eddy current losses that were encountered in the prior art. Bonded iron minimizes eddy current losses at high flywheel velocities. A preferred bonded iron is manufactured by Hoeganaes Corporation, of Riverton, N.J., and is identified as model number SC120.

The present invention provides manufacturing benefits because the rotor 20 and stator 30 are easily manufactured. The rotor 20 may be formed as a single component such that all the parts are molded together at one time. Alternatively, the parts may be separately molded and press fit or glued together. A type of glue that may be used is epoxy. The material selected for the flywheel 22 of the rotor 20 preferably is selected to be suited for a particular application. For instance, some materials are preferred when the rotor is expected to be subjected to high rotational inertia. Other materials are preferred when the rotor is expected to be subjected to low rotational inertia.

It should be noted that while an eight pole flywheel rotor 30 with a three-legged stator 20 is shown and described as a preferred embodiment, other configurations are within the scope of the invention. For instance, fewer than eight or greater than eight poles may be provided. In addition, a U-shaped core may be utilized, among other configurations.

While various descriptions, embodiments, and aspects of the present inventions are described above, it should be understood that the various features can be used singly or in any combination thereof. Each of the separate embodiments of the Figures may be used in conjunction with or side-by-side with the other embodiments. Therefore, this invention is not to be limited to only the specifically preferred embodiments depicted herein.

Further, it should be understood that variations and modifications within the spirit and scope of the invention may occur to those skilled in the art to which the invention pertains. Accordingly, all expedient modifications readily attainable by one versed in the art from the disclosure set forth herein that are within the scope and spirit of the present invention are to be included as further embodiments of the present invention.

What is claimed is:

1. A flywheel magneto generator for an engine comprising:
   a rotor mounted for axial rotation to an engine output shaft, the rotor having a non-ferromagnetic inner portion and at least one magnetically conductive outer portion, said rotor having a periphery defined by a path of rotation of the outer portion;
   a stator core disposed adjacent to the periphery of the rotor and operatively associated therewith;
   a magnet operatively coupled to the stator core; and
   at least one coil associated with the stator core;
   wherein the stator core is E-shaped having two outer legs and a center leg, the magnet is connected to the center leg of the core, and the at least one coil is associated with one of the outer legs of the core.

2. The flywheel magneto generator of claim 1, wherein the at least one outer portion is a pole and a plurality of poles are provided.

3. The flywheel magneto generator of claim 3, wherein the plurality of poles are spaced relative to one another to define a gap between each pole.

4. The flywheel magneto generator of claim 3, wherein each gap between the plurality of poles is substantially equal in size.

5. The flywheel magneto generator of claim 2, wherein each of the plurality of poles are magnetically isolated from one another.

6. The flywheel magneto generator of claim 1, wherein the rotor includes a connection point for attachment to an engine output shaft.

7. The flywheel magneto generator of claim 1, wherein two coils are provided and the stator core has at least two legs, and each coil is associated with one of the legs of the stator core.

8. The flywheel magneto generator of claim 1, wherein the at least one magnetically conductive outer portion and the stator core are made of bonded iron.

9. A flywheel magneto generator for an engine comprising:
   a rotor mounted for axial rotation to an engine output shaft, the rotor having a non-ferromagnetic inner portion and a magnetically conductive outer portion comprising a plurality of poles, said rotor having a periphery defined by a path of rotation of the poles;
   a stator core disposed adjacent to the periphery of the rotor and operatively associated therewith;
   a magnet operatively coupled to the stator core; and
   at least one coil associated with the stator core;
   wherein the stator core has a width that extends substantially between three poles.

10. A flywheel magneto generator for an engine comprising:
    a rotor mounted for axial rotation to an engine output shaft, the rotor having a non-ferromagnetic inner portion and a magnetically conductive outer portion comprising a plurality of poles, said rotor having a periphery defined by a path of rotation of the poles;
    a stator core disposed adjacent to the periphery of the rotor and operatively associated therewith;
    a magnet operatively coupled to the stator core; and
    at least one coil associated with the stator core,
    wherein the plurality of poles are spaced relative to one another to define a gap between each pole, and the magnet has a width that is substantially equivalent to the width of the gap between the poles.

11. A flywheel magneto generator for an engine comprising:
    a rotor mounted for axial rotation to an engine output shaft, the rotor having a non-ferromagnetic inner portion and at least one magnetically conductive outer portion, said rotor having a periphery defined by a path of rotation of the outer portion;
    a stator core disposed adjacent to the periphery of the rotor and operatively associated therewith, the stator core having at least two legs;
    a magnet operatively coupled to the stator core; and
    two coils associated with the stator core, each coil associated with one of the legs of the stator core;
    wherein the rotor rotates at a selected speed and, during rotation, the two coils are continuously coupled to the magnet of the stator core.

12. A flywheel magneto generator comprising:
    a rotor including:
    a flywheel center portion having a circumference; and
    a plurality of poles positioned around the circumference of the flywheel center portion, with each pole having a width,
    wherein a gap is provided between each of the plurality of poles; and a stator operatively coupled to the rotor, said stator including:
    an E-shaped core having two outer legs and a center leg, with a distance provided between the two outer legs; and a magnet having a width positioned at the end of the center leg, wherein the gap between the poles is substantially equivalent to the width of the magnet, and the width of each pole is substantially equivalent to the distance between the two outer legs of the core.

13. The flywheel magneto generator of claim 12, wherein the rotor is rotatable and the stator is substantially fixed in position relative to a periphery of the rotor, and the ends of the outer legs of the E-shaped core and the magnet are in close proximity to the periphery of the rotor.

14. The flywheel magneto generator of claim 13, wherein the ends of the legs of the E-shaped core are configured and dimensioned to substantially align with the periphery of the rotor.

15. The flywheel magneto generator of claim 14, wherein a clearance in the amount of about 1 millimeter is provided between the ends of the legs and the magnet from the periphery of the rotor.

16. The flywheel magneto generator of claim 12, further comprising at least one coil is operatively coupled to a portion of the E-shaped core.

17. The flywheel magneto generator of claim 16, wherein two coils are provided and one coil is operatively coupled to one of the outer legs of the E-shaped core and the other coil is operatively coupled to the other outer leg of the E-shaped core.

18. A method of generating electrical energy in an engine having an output shaft with a flywheel magneto generator associated with the output shaft, comprising:

providing a non-ferromagnetic flywheel having a circumference with a plurality of magnetically conductive poles magnetically isolated from each other and spaced at equal intervals around the circumference of the flywheel;

providing an E-shaped stator assembly having two outer lees and a center leg, with one magnet connected to the center leg of the assembly and at least one coil operatively coupled with one of the outer legs of the assembly, wherein the stator assembly is in close association with the flywheel;

rotating the flywheel to generate energy through the at least one coil.

19. A method of generating electrical energy in an engine having an output shaft with a flywheel magneto generator associated with the output shaft, comprising:

providing a non-ferromagnetic flywheel having a circumference with a plurality of magnetically conductive poles spaced at equal intervals around the circumference of the flywheel;

providing a stator assembly with one magnet and at least one coil operatively coupled to the assembly, wherein the stator assembly is E-shaped, having two outer legs and a center leg, with one coil wrapped around one of the outer legs, another coil wrapped around the other outer leg, and a magnet positioned at the end of the center leg, the stator assembly being in close association with the flywheel; and rotating the flywheel to generate energy through the at least one coil.

20. The method of generating electric energy of claim 19, further comprising:

controlling the flow of generated energy to supply power to charge a battery when the engine is operated above a preselected speed.

21. A flywheel magneto generator for an engine comprising:

a rotor mounted for axial rotation to an engine output shaft, the rotor having a non-magnetically conductive inner portion and a plurality of magnetically conductive poles;

said rotor having a periphery defined by a path of rotation of the poles;

a stator core disposed adjacent to the periphery of the rotor and operatively associated therewith;

a magnet operatively coupled to the stator core; and at least one coil associated with the stator core.

22. The flywheel magneto generator of claim 21, wherein the stator core is E-shaped having two outer legs and a center leg, the magnet is connected to the center leg of the core, and the at least one coil is associated with an outer leg of the core.

23. The flywheel magneto generator of claim 21, wherein the plurality of poles are spaced relative to one another to define a gap between each pole.

24. The flywheel magneto generator of claim 23, wherein each gap between the plurality of poles is substantially equal in size.

25. The flywheel magneto generator of claim 21, wherein each of the plurality of poles are magnetically isolated from one another.

26. The flywheel magneto generator of claim 21, wherein the rotor includes a connection point for attachment to an engine output shaft.

27. The flywheel magneto generator of claim 21, wherein two coils are provided and the stator core has at least two legs, and each coil is associated with one of the legs of the stator core.

28. The flywheel magneto generator of claim 21, wherein the magnetically conductive poles and the stator core are made of bonded iron.

* * * * *